United States Patent

Blasen et al.

[11] Patent Number: 5,383,651
[45] Date of Patent: Jan. 24, 1995

[54] ALUMINUM COIL ANNEALING TRAY SUPPORT PAD

[75] Inventors: John E. Blasen, Trenton, Tenn.; Tony G. Carroll, Evansville, Ind.

[73] Assignee: Pyrotek, Inc., Spokane, Wash.

[21] Appl. No.: 193,791

[22] Filed: Feb. 7, 1994

[51] Int. Cl.⁶ ............................................. F26D 5/00
[52] U.S. Cl. ................................. 266/274; 266/287; 432/253
[58] Field of Search ................ 266/287, 274, 280; 432/253, 260, 261; 501/95

[56] References Cited

U.S. PATENT DOCUMENTS

| | | | |
|---|---|---|---|
| 4,381,855 | 5/1983 | Ryan | 266/287 |
| 4,577,839 | 3/1986 | Carlson et al. | 266/280 |
| 4,726,568 | 2/1988 | Nicholson | 266/287 |

*Primary Examiner*—Scott Kastler
*Attorney, Agent, or Firm*—Wells, St. John, Roberts, Gregory & Matkin

[57] ABSTRACT

In a preferred embodiment of this invention as illustrated in the accompanying drawings in FIGS. 5 and 6, an annealing tray coil support pad 24 is formed of a woven cloth high temperature resistant fabric layer 26 and a similar bottom layer 28. The woven cloth is made of high tensile strength fibers. An intermediate layer 34 composed of a high density matted fiberboard insulative material of a thickness of between 0.75 inches and 3 inches is positioned between the top layer 26 and the bottom layer 28 for providing sufficient support to aluminum sheet coil 10 to minimize its peripheral deformation while the coil is being processed through one or more annealing furnaces. Pad 24 substantially reduces the amount of deformation and therefore the amount of waste material from each aluminum sheet coil 10.

81 Claims, 5 Drawing Sheets

ALUMINUM COIL ANNEALING TRAY SUPPORT PAD

TECHNICAL FIELD

This invention relates to aluminum coil annealing tray support pads for minimizing deformation of outer layers of large aluminum coils while the coils are being transported and annealed subsequent to being formed.

BACKGROUND OF THE INVENTION

Aluminum rolling mills frequently roll aluminum ingots into very long thin sheets having a thickness of approximately one-quarter inch and a width of between 40 and 60 inches. For handling purposes, the long sheets are formed into coils illustrated in FIG. 1, of approximately 6 to 8 feet in diameter, each weighing upwards of 40,000 lbs. and 50,000 lbs. While still in the coil form the aluminum is frequently passed through one or more annealing furnaces where the aluminum is heated to temperature above 400° F. Frequently the aluminum coils are annealed at temperature of between 450° F. and 1050° F. During the annealing process, the large heavy coils 10 are normally supported on supports that have wide inclined, facing surfaces.

It is common for outer layers of the coils to deform and flatten out or assume the contour of the inclined support surfaces along the periphery of the coils where the coils are in contact with the inclined surfaces of the support tray. It is not unusual for several layers of each coil to be sufficiently deformed that it is necessary to cut the deformed layers from the coiled sheet prior to final shipment to a customer. The removed deformed portion is treated as scrap and sent back to the melting furnace. Such removed deformed portion represents a very significant loss.

Furthermore it is not unusual for the inclined support surfaces of the trays to become scarred and defaced with extended use. Such defacing is frequently imprinted into the outer layer of the coil, requiring that the outer layer be removed as defective.

Several attempts have been made to place various types of padding materials on the tray support surfaces to minimize the scarring and shape deformations. Such attempts have included padding materials such as corrugated cardboard sheets, fiber glass bats (3 lbs/cu.ft.) and hard rubber blocks. However, none of these previous attempts appear to have worked satisfactorily under the harsh conditions.

One of the principle objects and advantages of this invention is to provide a reusable aluminum coil annealing tray support pad that has proven effective to substantially reduce the amount of number of layers that are materially deformed.

These and other objects and advantages will become apparent upon reading the following detailed description of preferred embodiments of the present invention.

BRIEF DESCRIPTION OF THE DRAWINGS

Preferred embodiments of the invention are described below with reference to the accompanying drawings, which are briefly described below.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
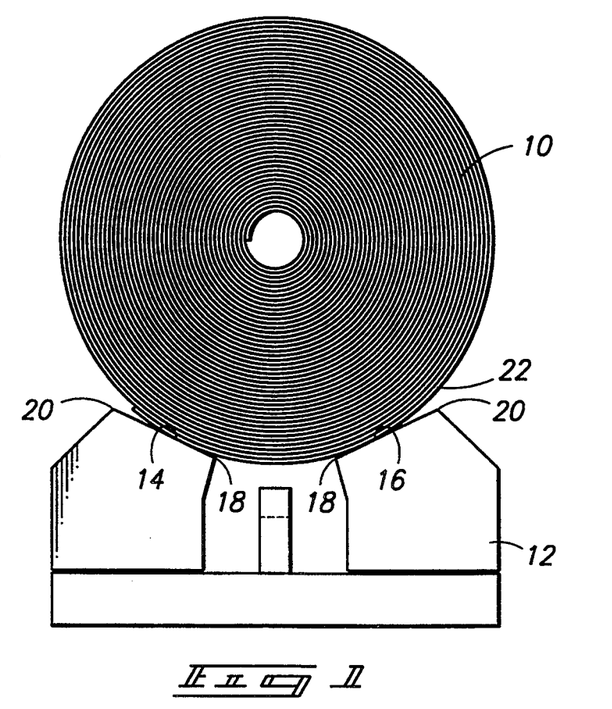
FIG. 1 is a side view of an aluminum coil annealing tray showing a large aluminum sheet coil supported thereon.

FIG. 1 illustrates a large diameter aluminum sheet coil 10 that is formed from a long aluminum sheet that has been extruded or rolled to a thickness of approximately ¼ inch and then wound onto a mandrill for storage and transportation purposes. After being initially formed, the coil 10 is generally transferred through one or more annealing furnaces to anneal the aluminum metal to remove metallurgical stress.

Figure 2:
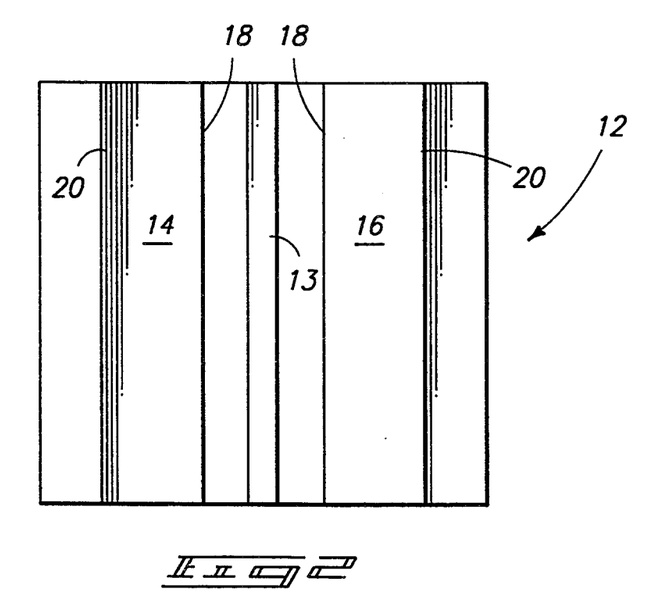
FIG. 2 is a top elevation view of the annealing tray.
Figure 3:
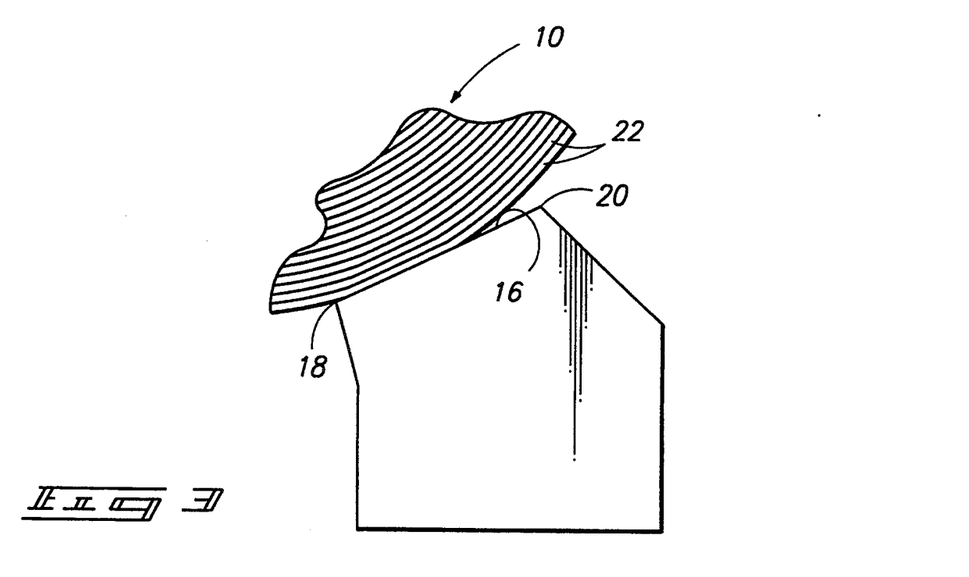
FIG. 3 is a fragmentary side elevational view of a portion of an outer periphery of the coil illustrating flattened sections of outer layers supported by support surfaces of the annealing tray.
Figure 4:
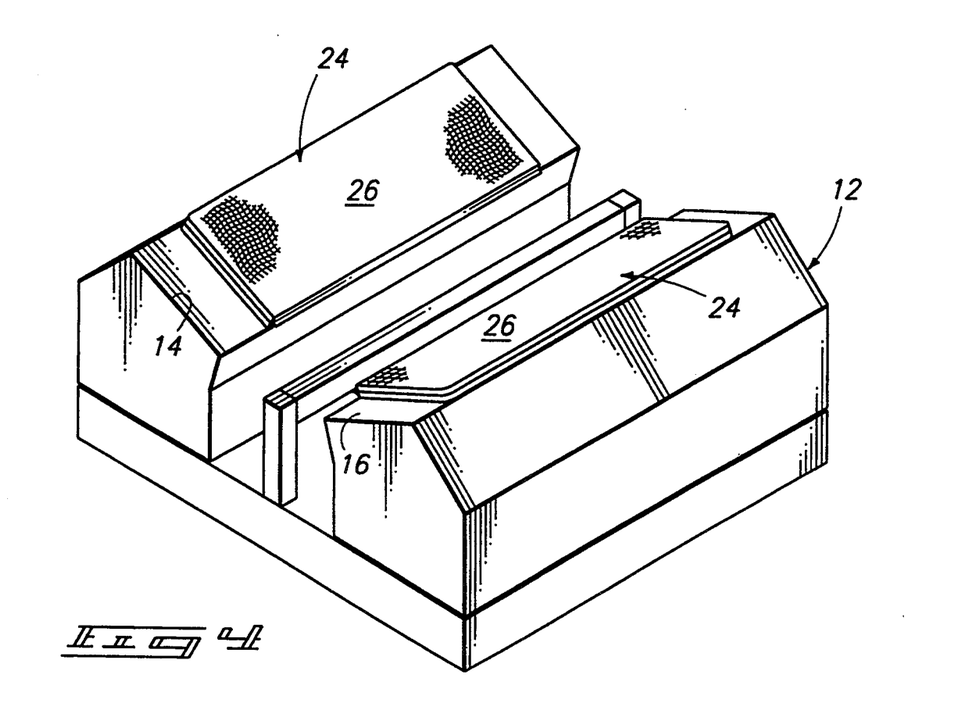
FIG. 4 is an isometric view of the annealing tray having a preferred embodiment of a coil support pad overlying the support surfaces of the annealing tray.

A support tray or saddle 12 (FIGS. 2–4) is provided to transport and support the coil. The tray 12 has two facing inclined surfaces 14 and 16 on which the coil 10 rests with the outer periphery of the coil engaging the inclined surfaces 14 and 16. The inclined surfaces 14 and 16 extend from spaced inner edges 18 to outer edges 20. In the prior art configuration, several of outer layers 22 of the coil 10 flatten and become deformed from their otherwise circular radius of curvature by conforming to the contour of the surfaces 14 and 16 as illustrated in FIG. 3.

Figure 5:
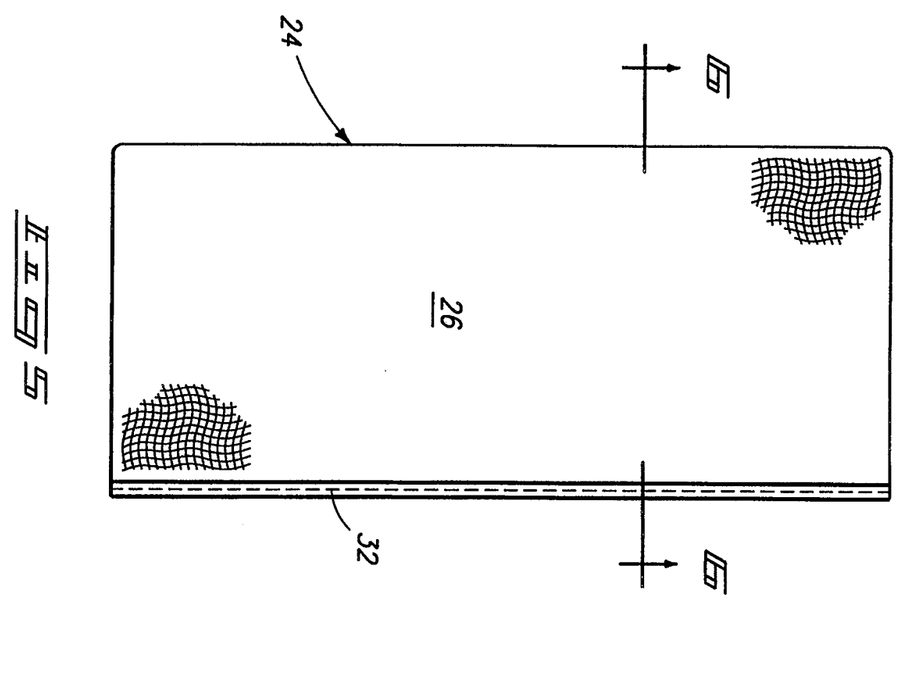
FIG. 5 is a top elevational view of the coil support pad illustrated in FIG. 4.

One of the purposes of this invention is provide an annealing tray coil support pad generally designated with the numeral 24 that is inserted between the surfaces 14 and 16 and the outer coil layer 22 to minimize the deformation of the outer coil layers 22 while the coils are being supported on the support tray 12 during the annealing processes. In the preferred embodiment of the pad 24, illustrated in FIGS. 4–6, the pad is preferably of a rectangular shape of approximately 20 inches by 45 inches in which the pad 24 is mounted with the 20-inch dimension extending between the inner edge 18 and the outer edge 20, and the 45-inch dimension extending in the width direction of the support tray 12.

The pad 24 includes a top layer 26 that is formed of a woven cloth material that is heat and wear resistant, and is flexible. Preferably the woven cloth has fibers with high tensile strengths, generally in the neighborhood of 85 lbs. to 220 lbs. The individual fibers are preferably formed of a filament material having diameters greater than 6 microns and preferably between 6 and 9 microns. The pad 24 further includes a bottom layer 28 (FIG. 6) that is made of woven cloth preferably of the same material as the top layer 26.

In the preferred embodiment, at least some of the fibers are formed of texturized metal reinforced long-strand fiberglass fibers. Such fibers may be purchased under the brand name "ZETEX" from Newtex Industries, Inc. of Victor N.Y. An alternate fiber is a high tensile quartz fiber sold under the brand name "ALPHA-SIL" by Alpha Associates Inc. of Woodridge, N.J. Preferably, the fabric has a fabric density of between 18 and 48 oz. per square yard, and most preferred between 42 oz. pre square yard and 48 oz. per square yard.

In the preferred configuration, the pad includes inside hem 30 (FIG. 6) that extends along three sides of the rectangular pad 24 and an outside hem 32 extending along the outside of the fourth side to form an enclosed pocket between the top layer 26 and the bottom layer 28.

Figure 6:
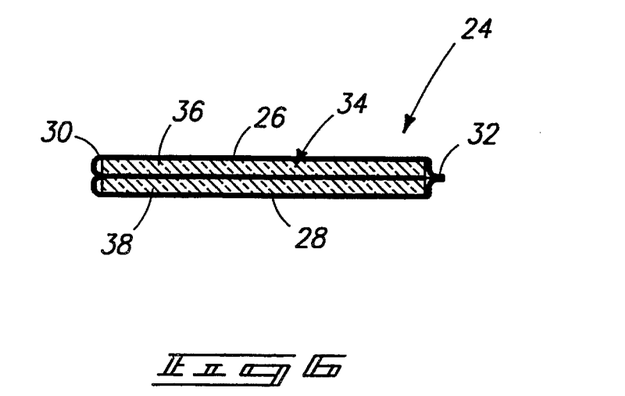
FIG. 6 is a vertical cross-sectional view taken along line 6—6 in FIG. 5.
Figure 7:
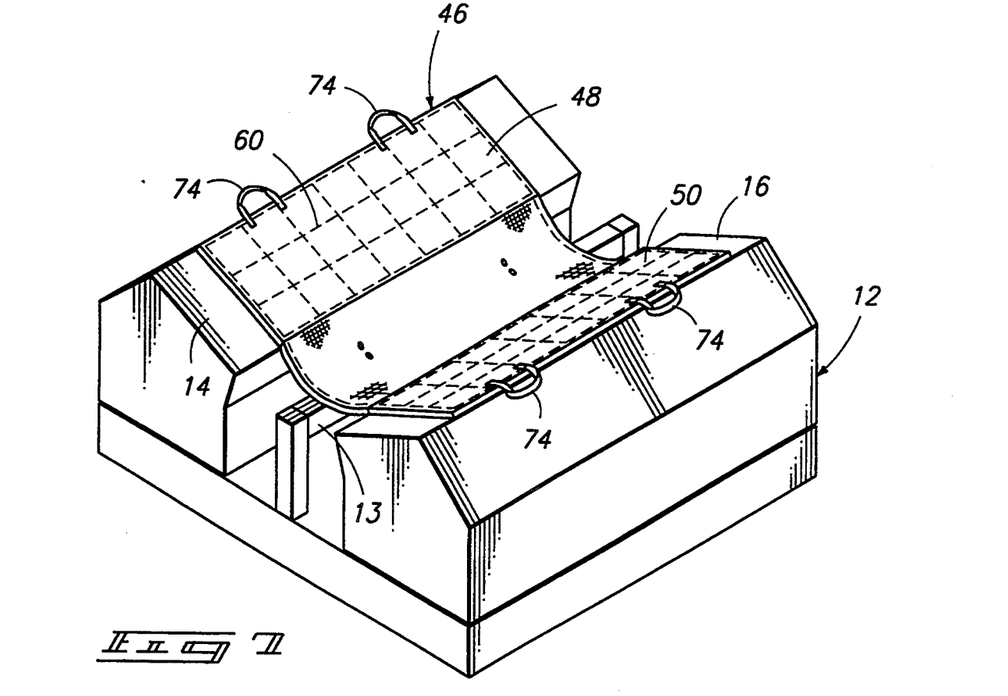
FIG. 7 is isometric view of the annealing tray having an alternate preferred embodiment of a coil support pad overlying the inclined surfaces of the annealing tray.

The pad 24 includes an intermediate layer or blanket 34 of high density, matted fiber blanket material that has a thickness of between 0.75 inches and 3.0 inches. In the preferred embodiment, the blanket 34 includes an upper section 36 and a lower section 38 that have a combined thickness of approximately 1½ inches. In the preferred embodiment, the blanket 34 is manufactured from high density mineral wool such as FBX manufactured by Fibrex Inc. of Aurora, Ill. The blanket is preferably formed of a compressed vitreous mineral fiber block or board that is compressed to a density of between 8 lbs./cu. ft. and 18 lbs./cu. ft. A preferred density range is between 15 lbs./cu. ft. and 18 lbs./cu. ft. The high density, matted fiber insulated blanket 34 is sufficiently deformable, yet have sufficient strength, to support the coil on the inclined surfaces 16 and 18 to deform to the general contour and curvature of the outer periphery layer 22 while uniformly supporting the coil to prevent substantial deformation of the outer coil layers 22. Furthermore, the pad must be sufficiently resistant to high temperatures encountered in the annealing furnace, and to be of sufficient durability for repetitive use.

An alternative preferred embodiment is illustrated in FIGS. 7-10 that includes an annealing tray coil support pad 46 that is of sufficient size to extend between the inclined surfaces 14 and 16 to form a single blanket for both of the surfaces 14 and 16. The pad 46 in one preferred embodiment has an area dimension of approximately 60 inches by 70 inches, in which the 70-inch dimension extends in the direction between the inclined surfaces 14 and 16, whereas the 60-inch dimension extends in the wide dimension of the tray 12. The pad 46 is subdivided into three sections. The three sections include side sections 48 and 50 that are approximately 25 in.×60 in. and a central section 52 that is approximately 20 in.×60 in. The dimensions of the pad will vary depending upon the size and dimensions of the tray 12. However, the important aspect is that the pad 46 is a unitary pad that extends onto both inclined surfaces 14 and 16.

Figure 8:
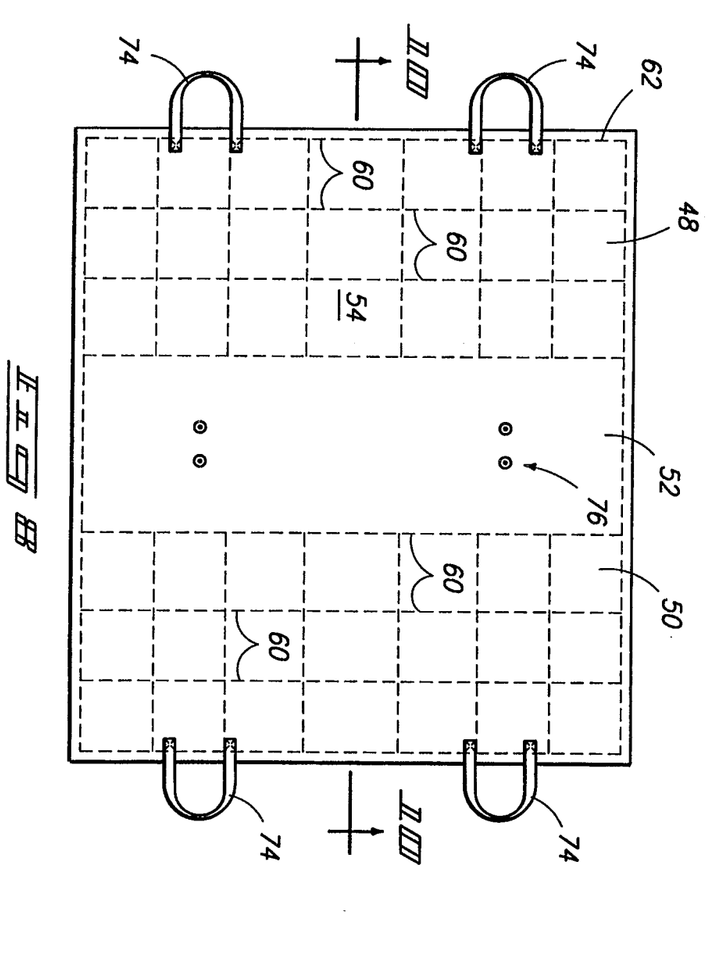
FIG. 8 is a top elevational view of the coil support pad illustrated in FIG. 7.
Figure 10:
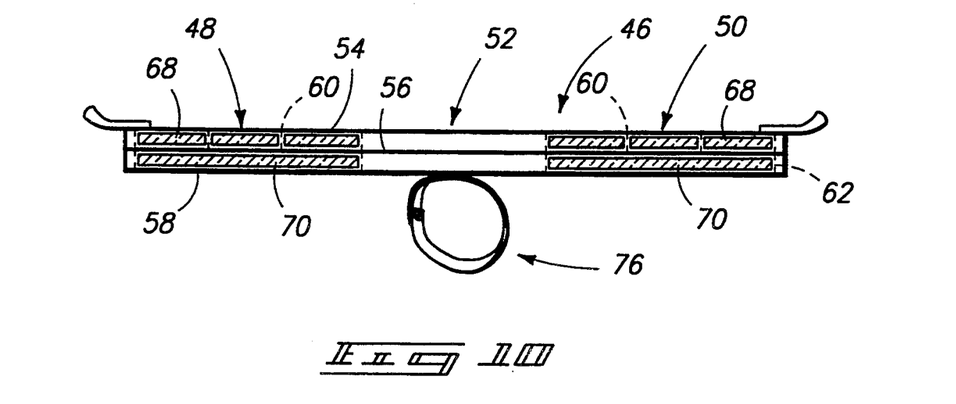
FIG. 10 is a vertical cross-sectional view taken along line 10—10 in FIG. 8.

The pad 46 includes a top layer 54 of high strength woven cloth, a middle layer 56 of high strength woven cloth and a bottom layer 58 of woven cloth. In the preferred embodiment, top layer 54 and middle layer 56 are quilted together as illustrated in FIGS. 8 and 10, forming individual pockets between the quilt stitching 60. The pad 46 includes a peripheral hem 62.

The pad 46 includes an intermediate insulative layer 64 of a high density matted fiber blanket that is composed of an upper portion 68 and a lower portion 70. In the preferred embodiment, the upper portion 68 is formed of individual members that fit within the pockets formed by the quilted stitching 60. The quilted stitching 60 prevents the discrete members from migrating in either the lateral or longitudinal dimension of the pad 46.

In the preferred embodiment, the top layer 54 and the bottom layer 58 are formed of a high temperature woven fabric cloth with high tensile strength fibers. In the preferred embodiment, the top layer 54 and the bottom layer 58 are formed of a blend of aramid fibers and fiberglass. A commercially available aramid fiber is sold under the brand name "KEVLAR" by E. I. du Pont de Nemours & Company. In a preferred embodiment, the upper layer 54 and the bottom layer 58 are formed of the high tensile strength woven fabric sold under the brand name NORFAF by Amatex Inc., of Norristown, Pa. In the preferred embodiment, the top layer 54 and 58 are of sufficient cloth weight of between 18 oz. and 30 oz. per square yard. It is particularly important that the fibers in the layers 54, 56 and 58 do not melt at temperatures below 400° F. and preferably not below 700° F. The middle layer 56 may be formed of the same material as the top layer 54 and the bottom layer 58, however the middle 56 may be formed of a fiberglass cloth preferably having a weight in the neighborhood weight of approximately 18 oz. per square yard.

Each of the blanket portions 68 and 70 are formed of a high density fiberglass mat in which the combined thickness of the upper and lower portions 68 and 70 is between 0.75 inches and 3.0 inches. Preferably, each of the upper and lower portions 68, 70 is approximately ½ inch in thickness and has a density of between 12 and 8 lbs./cu. yd. One such material is a matted fiberglass material sold under the brand name "TEMPMAT" by the J. P. Stevens Company of Burlington, N.C.

Figure 9:
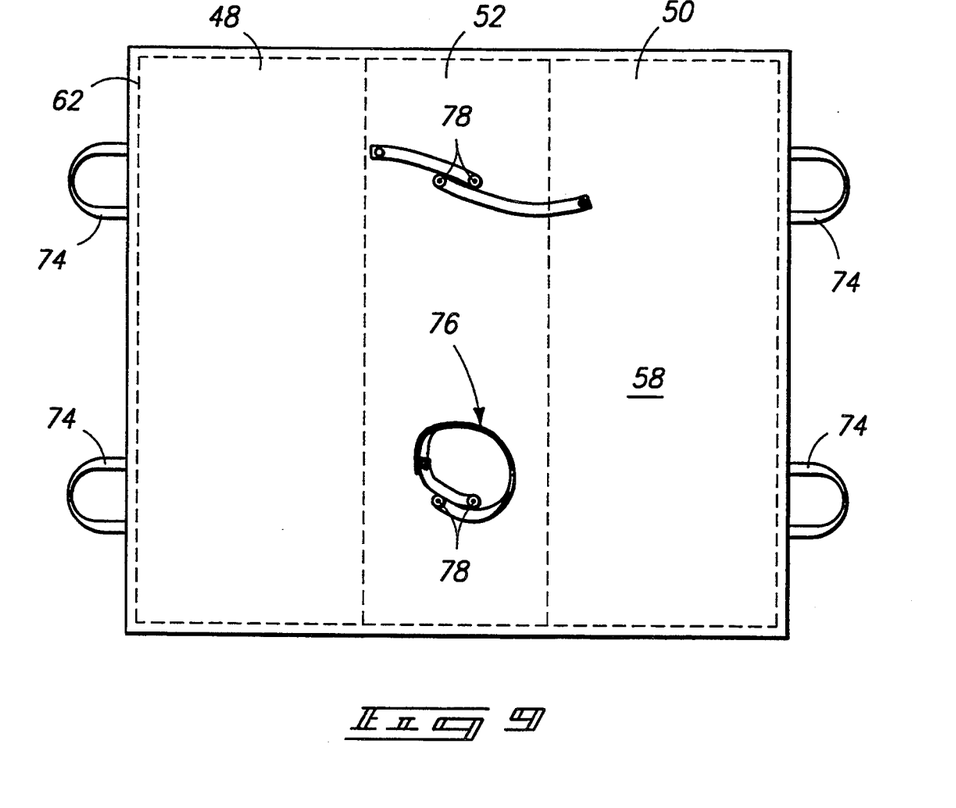
FIG. 9 is a bottom elevational view of the coil support pad illustrated in FIG. 8.

As illustrated in FIG. 8-10, the pad 46 additionally has handle elements or loops 74 at side edges to assist the personnel to transport and to mount the pad 46 on the tray 12 with the side sections 48 and 50 residing on the inclined surfaces 14 and 16 respectively, and the central section 52 extending between the inclined surfaces 14 and 16. It is preferable that the handle elements 74 are composed of the same fabric material as that of the top layer 54 or the bottom layer 58. The handle elements 74 are attached to the side sections 48 and 50 along the periphery. During storage, the pad 46 may be folded in half and mounted on hooks that would extend through the handle loops 74.

Additionally, the alternate preferred pad 46 includes attachment means 76 that is best illustrated in FIGS. 9 and 10 for securely attaching the pad 46 to the tray 12. As illustrated in FIG. 2, the tray 12 has a cross beam 13 to position between the inclined surfaces 14 and 16. The attachment means 76 preferably includes releasable straps that extend about the cross beam 13 to hold the pad 46 in place. The attachment means 76 includes snap fasteners 78 to quickly release the straps from the cross beam 13. Other types of fastening arrangements may be provided.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. An aluminum coil annealing tray support pad for mounting on two facing and spaced support surfaces of an aluminum coil annealing tray to support an aluminum coil therebetween to minimize deformation of outer layers of the aluminum coil, comprising;
   a first side section for mounting on one of the tray support surfaces to receive one portion of the coil;
   a second side section for mounting on the other of the tray support surfaces to receive a second portion of the coil;
   a central section extending between the first and second side sections;
   wherein the first and second sections include;
      a top layer formed of a wear resistant woven cloth that is composed of high tensile strength fibers that have melting temperatures above 400° F. for engaging the outer layer of the aluminum coil;
      a bottom layer formed of a wear resistant woven cloth that is composed of high tensile strength fibers that have melting temperatures above 400° F. for engaging an inclined surface of the aluminum coil annealing tray;
      a middle layer formed of a woven cloth that is composed of heat resistant fibers that have melting temperatures above 400° F.;
      an upper thick high density, matted fiber insulative blanket interposed between the top and middle woven cloth layers;
      a lower thick high density, matted fiber insulative blanket interposed between the middle and bottom woven cloth layers; and
      wherein the upper and lower matted fiber insulative blankets are sufficiently crush resistent to enable the pad sections to deform to the contour of the periphery of the aluminum coil while providing substantially uniform coil support to minimize deformation of the outer layers of the coil.

2. The aluminum coil annealing tray support pad as defined in claim 1 wherein top and middle woven cloths are quilted together forming pockets therebetween and wherein the upper insulative blanket comprises individual members that are mounted within the pockets.

3. The aluminum coil annealing tray support pad as defined in claim 2 wherein middle and bottom woven cloths are not quilted together.

4. The aluminum coil annealing tray support pad as defined in claim 1 wherein the pad has handle means at the side sections for assisting in the transportation and mounting of the pad on the tray surfaces.

5. The aluminum coil annealing tray support pad as defined in claim 1 wherein the pad has attachment means for attaching the pad to the tray.

6. The aluminum coil annealing tray support pad as defined in claim 5 wherein the attachment means includes straps affixed to the pad with releasable fastening means for connecting the straps to the tray.

7. An aluminum coil annealing tray support pad for mounting on inclined surfaces of an aluminum coil annealing tray to support an aluminum coil thereon to minimize deformation of outer layers of the aluminum coil, comprising:
   a top layer formed of a wear resistant woven cloth that is composed of high tensile strength fibers that have melting temperatures above 400° F. for engaging the outer layer of the aluminum coil;
   a bottom layer formed of a wear resistant woven cloth that is composed of high tensile strength fibers that have melting temperatures above 400° F. for engaging an inclined surface of the aluminum coil annealing tray;
   one or more thick intermediate layers formed of a high density, matted fiber insulative blanket that is sufficiently crush resistent to enable the pad to deform to the contour of the periphery of the aluminum coil while providing substantially uniform coil support to minimize deformation of the outer layers of the coil;
   wherein the woven cloth of the top layer has a fabric weight of between 18 oz. per square yard and 48 oz. per square yard; and
   wherein the high tensile strength fibers include texturized metal reinforced long strand fiberglass fibers.

8. The aluminum coil annealing tray support pad as defined in claim 7 wherein the high strength fibers of the top layer and the bottom layer have diameters greater than 6 microns of an inch.

9. The aluminum coil annealing tray support pad as defined in claim 7 wherein the high strength fibers of the top layer and the bottom layer have diameters of approximately 9 microns of an inch.

10. The aluminum coil annealing tray support pad as defined in claim 7 wherein the woven cloth of the top layer has a fabric weight of between 42 oz. per square yard and 48 oz. per square yard.

11. The aluminum coil annealing tray support pad as defined in claim 7 wherein the woven cloth of the top layer has a fabric weight of between 18 oz. per square yard and 30 oz. per square yard.

12. The aluminum coil annealing tray support pad as defined in claim 7 wherein the matted fiber insulative blanket has a thickness between 0.75 inches and 3.0 inches.

13. The aluminum coil annealing tray support pad as defined in claim 7 wherein the matted fiber insulative blanket has a density of 8 lbs./cu. ft. and 18 lbs./cu. ft.

14. The aluminum coil annealing tray support pad as defined in claim 7 wherein the matted fiber insulative blanket has a density of 12 lbs./cu. ft. and 18 lbs./cu. ft.

15. The aluminum coil annealing tray support pad as defined in claim 7 wherein the matted fiber insulative blanket includes mineral wool fibers having diameters greater than 6 micron of an inch.

16. The aluminum coil annealing tray support pad as defined in claim 7 wherein the matted fiber insulative blanket includes glass fibers having diameters greater than 6 micron of an inch.

17. The aluminum coil annealing tray support pad as defined in claim 7 further comprising a middle layer formed of a woven cloth having fibers that have melting temperatures greater than 400° F. and wherein the high density, matted fiber insulative blanket includes an upper blanket layer interposed between the top layer and the middle layer and a lower blanket layer interposed between the middle layer and the bottom layer.

18. The aluminum coil annealing tray support pad as defined in claim 17 wherein the top and middle layer are quilted together forming pockets between quilt stitches and wherein the upper blanket layer comprises individual insulative blanket members mounted in the pockets to minimize lateral migration of the upper layer with extended use.

19. The aluminum coil annealing tray support pad as defined in claim 7 wherein the aluminum coil annealing tray has two inclined support surfaces that face and are spaced from each other a preset distance and wherein at least one of the woven cloth layers has a sufficient area dimension to extend between the spaced inclined support surfaces and cover portions of both inclined tray surfaces defining side support sections and an interconnecting central section.

20. The aluminum coil annealing tray support pad as defined in claim 19 wherein each of the side support sections has the top layer, the bottom layer and one or more intermediate layers.

21. The aluminum coil annealing tray support pad as defined in claim 19 wherein the side support sections have carrying handles to facilitate transporting of the pad and the mounting of the pad on the tray.

22. The aluminum coil annealing tray support pad as defined in claim 19 wherein the central section has attachment means to enable the pad to be securely attached to the tray.

23. The aluminum coil annealing tray support pad as defined in claim 20 wherein the central section is without a high density, matted fiber insulative blanket.

24. The aluminum coil annealing tray support pad as defined in claim 20 wherein the side sections are quilted forming pockets and wherein the high density, matted fiber insulation blanket includes individual members that are mounted with the formed pockets.

25. An aluminum coil annealing tray support pad for mounting on inclined surfaces of an aluminum coil annealing tray to support an aluminum coil thereon to minimize deformation of outer layers of the aluminum coil, comprising:
 a top layer formed of a wear resistant woven cloth that is composed of high tensile strength fibers that have melting temperatures above 400° F. for engaging the outer layer of the aluminum coil;
 a bottom layer formed of a wear resistant woven cloth that is composed of high tensile strength fibers that have melting temperatures above 400° F. for engaging an inclined surface of the aluminum coil annealing tray;
 one or more thick intermediate layers formed of a high density, matted fiber insulative blanket that is sufficiently crush resistent to enable the pad to deform to the contour of the periphery of the aluminum coil while providing substantially uniform coil support to minimize deformation of the outer layers of the coil;
 wherein the woven cloth of the top layer has a fabric weight of between 18 oz. per square yard and 48 oz. per square yard; and
 wherein the high tensile strength fibers include high strength quartz fibers.

26. The aluminum coil annealing tray support pad as defined in claim 25 wherein the high strength fibers of the top layer and the bottom layer have diameters greater than 6 microns of an inch.

27. The aluminum coil annealing tray support pad as defined in claim 25 wherein the high strength fibers of the top layer and the bottom layer have diameters of approximately 9 microns of an inch.

28. The aluminum coil annealing tray support pad as defined in claim 25 wherein the woven cloth of the top layer has a fabric weight of between 42 oz. per square yard and 48 oz. per square yard.

29. The aluminum coil annealing tray support pad as defined in claim 25 wherein the woven cloth of the top layer has a fabric weight of between 18 oz. per square yard and 30 oz. per square yard.

30. The aluminum coil annealing tray support pad as defined in claim 25 wherein the matted fiber insulative blanket has a thickness between 0.75 inches and 3.0 inches.

31. The aluminum coil annealing tray support pad as defined in claim 25 wherein the matted fiber insulative blanket has a density of 8 lbs./cu. ft. and 18 lbs./cu. ft.

32. The aluminum coil annealing tray support pad as defined in claim 25 wherein the matted fiber insulative blanket has a density of 12 lbs./cu. ft. and 18 lbs./cu. ft.

33. The aluminum coil annealing tray support pad as defined in claim 25 wherein the matted fiber insulative blanket includes mineral wool fibers having diameters greater than 6 micron of an inch.

34. The aluminum coil annealing tray support pad as defined in claim 25 wherein the matted fiber insulative blanket includes glass fibers having diameters greater than 6 micron of an inch.

35. The aluminum coil annealing tray support pad as defined in claim 25 further comprising a middle layer formed of a woven cloth having fibers that have melting temperatures greater than 400° F. and wherein the high density, matted fiber insulative blanket includes an upper blanket layer interposed between the top layer and the middle layer and a lower blanket layer interposed between the middle layer and the bottom layer.

36. The aluminum coil annealing tray support pad as defined in claim 35 wherein the top and middle layer are quilted together forming pockets between quilt stitches and wherein the upper blanket layer comprises individual insulative blanket members mounted in the pockets to minimize lateral migration of the upper layer with extended use.

37. The aluminum coil annealing tray support pad as defined in claim 25 wherein the aluminum coil annealing tray has two inclined support surfaces that face and are spaced from each other a preset distance and wherein at least one of the woven cloth layers has a sufficient area dimension to extend between the spaced inclined support surfaces and cover portions of both inclined tray surfaces defining side support sections and an interconnecting central section.

38. The aluminum coil annealing tray support pad as defined in claim 37 wherein each of the side support sections has the top layer, the bottom layer and one or more intermediate layers.

39. The aluminum coil annealing tray support pad as defined in claim 37 wherein the side support sections have carrying handles to facilitate transporting of the pad and the mounting of the pad on the tray.

40. The aluminum coil annealing tray support pad as defined in claim 37 wherein the central section has attachment means to enable the pad to be securely attached to the tray.

41. The aluminum coil annealing tray support pad as defined in claim 38 wherein the central section is without a high density, matted fiber insulative blanket.

42. The aluminum coil annealing tray support pad as defined in claim 38 wherein the side sections are quilted forming pockets and wherein the high density, matted fiber insulation blanket includes individual members that are mounted with the formed pockets.

43. An aluminum coil annealing tray support pad for mounting on inclined surfaces of an aluminum coil annealing tray to support an aluminum coil thereon to minimize deformation of outer layers of the aluminum coil, comprising:

a top layer formed of a wear resistant woven cloth that is composed of high tensile strength fibers that have melting temperatures above 400° F. for engaging the outer layer of the aluminum coil;

a bottom layer formed of a wear resistant woven cloth that is composed of high tensile strength fibers that have melting temperatures above 400° F. for engaging an inclined surface of the aluminum coil annealing tray;

one or more thick intermediate layers formed of a high density, matted fiber insulative blanket that is sufficiently crush resistent to enable the pad to deform to the contour of the periphery of the aluminum coil while providing substantially uniform coil support to minimize deformation of the outer layers of the coil;

wherein the woven cloth of the top layer has a fabric weight of between 18 oz. per square yard and 48 oz. per square yard; and wherein the high tensile strength fibers include high strength aramid fibers.

44. The aluminum coil annealing tray support pad as defined in claim 43 wherein the high strength fibers of the top layer and the bottom layer have diameters greater than 6 microns of an inch.

45. The aluminum coil annealing tray support pad as defined in claim 43 wherein the high strength fibers of the top layer and the bottom layer have diameters of approximately 9 microns of an inch.

46. The aluminum coil annealing tray support pad as defined in claim 43 wherein the woven cloth of the top layer has a fabric weight of between 42 oz. per square yard and 48 oz. per square yard.

47. The aluminum coil annealing tray support pad as defined in claim 43 wherein the woven cloth of the top layer has a fabric weight of between 18 oz. per square yard and 30 oz. per square yard.

48. The aluminum coil annealing tray support pad as defined in claim 43 wherein the matted fiber insulative blanket has a thickness between 0.75 inches and 3.0 inches.

49. The aluminum coil annealing tray support pad as defined in claim 43 wherein the matted fiber insulative blanket has a density of 8 lbs./cu. ft. and 18 lbs./cu. ft.

50. The aluminum coil annealing tray support pad as defined in claim 43 wherein the matted fiber insulative blanket has a density of 12 lbs./cu. ft. and 18 lbs./cu. ft.

51. The aluminum coil annealing tray support pad as defined in claim 43 wherein the matted fiber insulative blanket includes mineral wool fibers having diameters greater than 6 micron of an inch.

52. The aluminum coil annealing tray support pad as defined in claim 43 wherein the matted fiber insulative blanket includes glass fibers having diameters greater than 6 micron of an inch.

53. The aluminum coil annealing tray support pad as defined in claim 43 further comprising a middle layer formed of a woven cloth having fibers that have melting temperatures greater than 400° F. and wherein the high density, matted fiber insulative blanket includes an upper blanket layer interposed between the top layer and the middle layer and a lower blanket layer interposed between the middle layer and the bottom layer.

54. The aluminum coil annealing tray support pad as defined in claim 53 wherein the top and middle layer are quilted together forming pockets between quilt stitches and wherein the upper blanket layer comprises individual insulative blanket members mounted in the pockets to minimize lateral migration of the upper layer with extended use.

55. The aluminum coil annealing tray support pad as defined in claim 43 wherein the aluminum coil annealing tray has two inclined support surfaces that face and are spaced from each other a preset distance and wherein at least one of the woven cloth layers has a sufficient area dimension to extend between the spaced inclined support surfaces and cover portions of both inclined tray surfaces defining side support sections and an interconnecting central section.

56. The aluminum coil annealing tray support pad as defined in claim 55 wherein each of the side support sections has the top layer, the bottom layer and one or more intermediate layers.

57. The aluminum coil annealing tray support pad as defined in claim 55 wherein the side support sections have carrying handles to facilitate transporting of the pad and the mounting of the pad on the tray.

58. The aluminum coil annealing tray support pad as defined in claim 55 wherein the central section has attachment means to enable the pad to be securely attached to the tray.

59. The aluminum coil annealing tray support pad as defined in claim 56 wherein the central section is without a high density, matted fiber insulative blanket.

60. The aluminum coil annealing tray support pad as defined in claim 56 wherein the side sections are quilted forming pockets and wherein the high density, matted fiber insulation blanket includes individual members that are mounted with the formed pockets.

61. An aluminum coil annealing tray support pad for mounting on inclined surfaces of an aluminum coil annealing tray to support an aluminum coil thereon to minimize deformation of outer layers of the aluminum coil, comprising:

a top layer formed of a wear resistant woven cloth that is composed of high tensile strength fibers that have melting temperatures above 400° F. for engaging the outer layer of the aluminum coil;

a bottom layer formed of a wear resistant woven cloth that is composed of high tensile strength fibers that have melting temperatures above 400° F. for engaging an inclined surface of the aluminum coil annealing tray;

a middle layer formed of a woven cloth having fibers that have melting temperatures greater than 400° F.;

thick intermediate layers formed of a high density, matted fiber insulative blanket that is sufficiently crush resistent to enable the pad to deform to the contour of the periphery of the aluminum coil while providing substantially uniform coil support to minimize deformation of the outer layers of the coil; and wherein the high density, matted fiber insulative blanket includes an upper blanket layer interposed between the top layer and the middle layer and a lower blanket layer interposed between the middle layer and the bottom layer.

62. The aluminum coil annealing tray support pad as defined in claim 61 wherein the high strength fibers of the top layer and the bottom layer have diameters greater than 6 microns of an inch.

63. The aluminum coil annealing tray support pad as defined in claim 61 wherein the high strength fibers of the top layer and the bottom layer have diameters of approximately 9 microns of an inch.

64. The aluminum coil annealing tray support pad as defined in claim 61 wherein the woven cloth of the top layer has a fabric weight of between 18 oz. per square yard and 48 oz. per square yard.

65. The aluminum coil annealing tray support pad as defined in claim 61 wherein the woven cloth of the top layer has a fabric weight of between 42 oz. per square yard and 48 oz. per square yard.

66. The aluminum coil annealing tray support pad as defined in claim 65 wherein the high tensile strength fibers include texturized metal reinforced long strand fiberglass fibers.

67. The aluminum coil annealing tray support pad as defined in claim 61 wherein the woven cloth of the top layer has a fabric weight of between 18 oz. per square yard and 30 oz. per square yard.

68. The aluminum coil annealing tray support pad as defined in claim 67 wherein the high tensile strength fibers include high strength quartz fibers.

69. The aluminum coil annealing tray support pad as defined in claim 67 wherein the high tensile strength fibers include high strength aramid fibers.

70. The aluminum coil annealing tray support pad as defined in claim 61 wherein the matted fiber insulative blanket has a thickness between 0.75 inches and 3.0 inches.

71. The aluminum coil annealing tray support pad as defined in claim 61 wherein the matted fiber insulative blanket has a density of 8 lbs./cu. ft. and 18 lbs./cu. ft.

72. The aluminum coil annealing tray support pad as defined in claim 61 wherein the matted fiber insulative blanket has a density of 12 lbs./cu. ft. and 18 lbs./cu. ft.

73. The aluminum coil annealing tray support pad as defined in claim 61 wherein the matted fiber insulative blanket includes mineral wool fibers having diameters greater than 6 micron of an inch.

74. The aluminum coil annealing tray support pad as defined in claim 61 wherein the matted fiber insulative blanket includes glass fibers having diameters greater than 6 micron of an inch.

75. The aluminum coil annealing tray support pad as defined in claim 61 wherein the top and middle layer are quilted together forming pockets between quilt stitches and wherein the upper blanket layer comprises individual insulative blanket members mounted in the pockets to minimize lateral migration of the upper layer with extended use.

76. The aluminum coil annealing tray support pad as defined in claim 61 wherein the aluminum coil annealing tray has two inclined support surfaces that face and are spaced from each other a preset distance and wherein at least one of the woven cloth layers has a sufficient area dimension to extend between the spaced inclined support surfaces and cover portions of both inclined tray surfaces defining side support sections and an interconnecting central section.

77. The aluminum coil annealing tray support pad as defined in claim 76 wherein each of the side support sections has the top layer, the bottom layer and one or more intermediate layers.

78. The aluminum coil annealing tray support pad as defined in claim 76 wherein the side support sections have carrying handles to facilitate transporting of the pad and the mounting of the pad on the tray.

79. The aluminum coil annealing tray support pad as defined in claim 76 wherein the central section has attachment means to enable the pad to be securely attached to the tray.

80. The aluminum coil annealing tray support pad as defined in claim 77 wherein the central section is without a high density, matted fiber insulative blanket.

81. The aluminum coil annealing tray support pad as defined in claim 77 wherein the side sections are quilted forming pockets and wherein the high density, matted fiber insulation blanket includes individual members that are mounted with the formed pockets.

* * * * *